(12) United States Patent
Hein, III

(10) Patent No.: US 7,747,037 B2
(45) Date of Patent: Jun. 29, 2010

(54) ROUTING NETWORKS FOR USE WITH CONTENT LINKING SYSTEMS

(75) Inventor: William C. Hein, III, Glenmoore, PA (US)

(73) Assignee: Digimarc Corporation, Beaverton, OR (US)

( * ) Notice: Subject to any disclaimer, the term of this patent is extended or adjusted under 35 U.S.C. 154(b) by 23 days.

(21) Appl. No.: 12/116,143

(22) Filed: May 6, 2008

(65) Prior Publication Data

US 2009/0123023 A1 May 14, 2009

Related U.S. Application Data

(63) Continuation of application No. 11/280,835, filed on Nov. 15, 2005, now Pat. No. 7,369,676, which is a continuation of application No. 10/032,212, filed on Dec. 20, 2001, now Pat. No. 6,965,683.

(60) Provisional application No. 60/257,822, filed on Dec. 21, 2000.

(51) Int. Cl.
H04K 1/00 (2006.01)

(52) U.S. Cl. ..................................... 382/100

(58) Field of Classification Search ................. 382/100, 382/232, 306; 235/494; 356/71; 340/5.6, 340/5.86; 348/460; 358/3.28; 380/42, 51, 380/54, 200, 232–234, 247, 255, 276–285; 705/44, 58; 704/273; 707/9, 101; 713/168
See application file for complete search history.

(56) References Cited

U.S. PATENT DOCUMENTS

| | | | |
|---|---|---|---|
| 5,444,779 A | 8/1995 | Daniele | |
| 5,606,609 A | 2/1997 | Houser et al. | |
| 5,901,224 A | 5/1999 | Hecht | |
| 5,905,800 A | 5/1999 | Moskowitz et al. | |
| 5,983,351 A | 11/1999 | Glogau | |
| 5,987,127 A | 11/1999 | Ikenoue et al. | |
| 6,003,030 A | 12/1999 | Kenner et al. | |
| 6,006,332 A | 12/1999 | Rabne et al. | |
| 6,108,703 A | 8/2000 | Leighton et al. | |
| 6,119,143 A | 9/2000 | Dias et al. | |
| 6,122,403 A | 9/2000 | Rhoads | |
| 6,170,014 B1 | 1/2001 | Darago et al. | |
| 6,185,598 B1 | 2/2001 | Farber et al. | |
| 6,233,684 B1 | 5/2001 | Stefik et al. | |
| 6,243,480 B1 | 6/2001 | Zhao et al. | |
| 6,249,226 B1 | 6/2001 | Harrison et al. | |
| 6,269,394 B1 | 7/2001 | Kenner et al. | |
| 6,289,450 B1 | 9/2001 | Pensak et al. | |
| 6,377,986 B1 | 4/2002 | Philyaw et al. | |
| 6,430,554 B1 | 8/2002 | Rothschild | |
| 6,466,329 B1 | 10/2002 | Mukai | |
| 6,491,217 B2 | 12/2002 | Catan | |
| 6,505,160 B1 * | 1/2003 | Levy et al. .................. 704/270 |
| 6,553,129 B1 * | 4/2003 | Rhoads ....................... 382/100 |
| 6,650,761 B1 | 11/2003 | Rodriguez et al. | |
| 6,651,053 B1 | 11/2003 | Rothschild | |
| 6,675,165 B1 | 1/2004 | Rothschild | |
| 6,701,369 B1 | 3/2004 | Philyaw | |
| 6,766,363 B1 | 7/2004 | Rothschild | |
| 6,947,571 B1 | 9/2005 | Rhoads et al. | |
| 6,965,683 B2 | 11/2005 | Hein, III | |
| 7,035,427 B2 * | 4/2006 | Rhoads ....................... 382/100 |
| 7,047,241 B1 * | 5/2006 | Erickson ......................... 707/9 |
| 7,111,170 B2 * | 9/2006 | Hein et al. .................. 713/176 |
| 7,240,100 B1 | 7/2007 | Wein et al. | |
| 7,248,717 B2 * | 7/2007 | Rhoads ....................... 382/100 |
| 7,293,093 B2 | 11/2007 | Leighton et al. | |
| 7,333,957 B2 * | 2/2008 | Levy et al. ..................... 705/58 |
| 2001/0021916 A1 | 9/2001 | Takai | |
| 2001/0021978 A1 | 9/2001 | Okayasu et al. | |
| 2001/0044824 A1 | 11/2001 | Hunter et al. | |
| 2001/0051996 A1 | 12/2001 | Cooper et al. | |
| 2002/0032698 A1 | 3/2002 | Cox | |
| 2002/0059162 A1 | 5/2002 | Shinoda et al. | |
| 2002/0062382 A1 | 5/2002 | Rhoads et al. | |
| 2002/0075298 A1 | 6/2002 | Schena et al. | |
| 2002/0080271 A1 | 6/2002 | Eveleens et al. | |
| 2002/0152388 A1 | 10/2002 | Linnartz et al. | |
| 2002/0194480 A1 | 12/2002 | Nagao | |
| 2003/0083098 A1 | 5/2003 | Yamazaki et al. | |

FOREIGN PATENT DOCUMENTS

| | | |
|---|---|---|
| WO | WO97/43736 | 11/1997 |
| WO | WO01/15021 | 3/2001 |
| WO | WO01/71517 | 9/2001 |
| WO | WO01/73586 | 10/2001 |

OTHER PUBLICATIONS

Zhao, Jian "A WWW Service to Embed and Prove Digital Copyright Watermarks", Proc. of the Europena Conference on Multimedia Applications, Services and techniques, pp. 1-15, May 1996.

* cited by examiner

*Primary Examiner*—Jose L Couso

(57) ABSTRACT

A method of linking a content object with a network resource presents a content object to a reader, discerns an identifier associated with the content object, transfers the identifier to an indexing system, and in response receives an internet address corresponding to the content object. To enhance the response of the indexing system, it includes multiple routers, which it selects based on location relative to the reader. For example, the method sends user location data to a master system, and in response, receives an address of an indexing system close to the user location.

5 Claims, No Drawings

ROUTING NETWORKS FOR USE WITH CONTENT LINKING SYSTEMS

RELATED APPLICATION DATA

This application is a continuation of Ser. No. 11/280,835, filed Nov. 15, 2005 (now U.S. Pat. No. 7,369,676) which is a continuation of U.S. patent application Ser. No. 10/032,212, filed Dec. 20, 2001 (now U.S. Pat. No. 6,965,683) which claims benefit of provisional application 60/257,822, filed Dec. 21, 2000, which are hereby incorporated by reference.

FIELD OF THE INVENTION

The invention relates to routers, and more particularly relates to routers used in linking to computer resources based on data represented in content identification technologies such as digital watermarks, bar codes, or the like.

BACKGROUND AND SUMMARY OF THE INVENTION

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. Nos. 6,122,403, and 6,614,914, are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

This document describes systems that use content identification technologies used to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.)

Another watermark application that encodes data to associate an object with a store of related data, is so-called "connected content" technology. In such applications, a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. U.S. Pat. No. 6,947,571 details a number of connected-content applications and techniques. The present assignee markets such technology under the brands "Digimarc MediaBridge," "Digimarc Mobile" and "ImageBridge." In the Digimarc MediaBridge offering, the system that associates object identifiers with corresponding computer resources is termed the "Grand Central" router.

One disclosed embodiment is a method of linking a content object with a network resource. The method comprises presenting a content object to a reader; discerning from data obtained by the reader an identifier associated with the content object; transferring the identifier to an indexing system; and receiving from the indexing system an internet address corresponding to said content object. The method further includes sending user data to a master system, the user data providing information related to user location; receiving from said master system an address of an indexing system close to the user location, the master system selecting the indexing system from among plural different indexing systems; and transferring said identifier to said selected indexing system using the address.

In one embodiment, the indexing system makes several routers available, and utilizes them in manners designed to speed system response time.

The foregoing and other features and advantages of the invention will be more readily apparent from the following detailed description.

DETAILED DESCRIPTION

To speed response time in systems like those referenced above (including the Digimarc MediaBridge application detailed in U.S. Pat. No. 6,947,571), it is desirable that the responding system be located close—in network terms—to the client application or device.

It has been the intent from the outset to have more than one Digimarc MediaBridge Grand Central router, and to field them at various locations throughout the US and internationally.

Based on the location of the user (using the country code or postal code they have stored on their computer or have given to Digimarc during the software registration process), we communicate with a specific Digimarc MediaBridge Grand Central router located closest to them geographically (or network-geographically).

When a user connects between their PC and a website hosted on a computer somewhere else in the world, the connection is not normally a single connection between just those two computers. The Internet isn't built that way. The Internet takes the user's request (specified via the Uniform Resource Locator—URL) and routes the user through whatever intermediary computers, routers and switches that seem appropriate at the time of the user's request. This mechanism is similar in many ways to making a long-distance phone call. Each of the connections through an intermediary is called a 'hop'. Typically, the further away the URL is geographically located on the world-wide web, the more 'hops' it takes to make the connection. The more 'hops' the more latency is introduced as each intermediary point and the slower the actual response and the less reliable the connection.

All communication between the Digimarc MediaBridge reader/detector application and the Digimarc MediaBridge Grand Central router is accomplished by sending messages back and forth over the Internet. One of the ways that Digimarc improves the reliability of its service and can slightly increase its speed is to minimize the 'hops' in the user's connection with the Digimarc MediaBridge Grand Central router. The simplest way to do this is to find the Digimarc MediaBridge Grand Central router geographically closest to the user.

One approach to this goal works as follows:

The reader/detector queries a "master" router when the reader/detector application is first invoked, sending along the country or postal code from the user's computer The "master" router matches the country or postal code to the appropriate Digimarc MediaBridge Grand Central router—the one closest to the user and sends that reply back to the reader/detector application The reader/detector application now uses this supplied closest Digimarc MediaBridge Grand Central router for all future communications required to perform its ID to action association functions A simple 'hop' map currently might look like this— originating user in Glenmoore, Pa. 19343. Digimarc MediaBridge Grand Central router located in Tulsa, Okla.

Glenmoore to Paoli, Pa. (ISP dial in connection point)

to Philadelphia, Pa. (Internet "hub")

to Dallas, Tex. (Internet "hub")

to Tulsa, Okla. (Internet "hub")

to Digimarc Offices in Tulsa, Okla.

With a second Digimarc MediaBridge Grand Central router located in Philadelphia, the 'hop' map looks like—

Glenmoore to Paoli, Pa. (ISP dial in connection point)

to Philadelphia, Pa. (Internet "hub")

to Philadelphia Digimarc MediaBridge Grand Central router

If the second Digimarc MediaBridge Grand Central router is located in New York, N.Y., the 'hop' map looks like—

Glenmoore to Paoli, Pa. (ISP dial in connection point)

to Philadelphia, Pa. (Internet "hub")

to NY, NY (Internet "hub")

to NY Digimarc MediaBridge Grand Central router

U.S. Pat. No. 6,947,571 also disclosed methods for handling watermark-based requests from client applications based, e.g., on the watermark's "type" and "number."

In an enhanced system, the client application can specify a router/product handler, allowing the Back Office facility to better load balance versus the associated watermark registry database. The client application can do this by appending a router name/number to the basic URL it now uses to communicate with the Back Office. Each of these "type-specific" Back Office router/product handlers can be responsible for servicing a specific, smaller portion of the entire registry database, speeding up their performance and keeping the consumer's perceived response time short.

This enhancement can be in addition to the "geographic routing" feature detailed above.

To provide a comprehensive disclosure without unduly lengthening this specification, the patents and applications cited in this specification are incorporated herein by references.

Having described and illustrated the subject technologies with reference to illustrative embodiments, it should be recognized that the invention is not so limited. For example, while the illustrative embodiment employed digital watermarking technology, the same principles can be applied in other contexts, such as bar code-based systems. Systems for linking to computer resources based on bar code indicia are shown, e.g., in U.S. Pat. Nos. 6,314,457, 6,154,738, 6,108,656, and 5,913,210.

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, I claim as my invention all such modifications as may come within the scope and spirit of the following claims and equivalents thereof.

I claim:

1. In a content identification system, a method of routing comprising:

distributing portions of content identification registry among plural computers at different locations;

receiving a request to associate a content object with information about the content object, the request being based on information discerned from perceptual information of the content object; and routing the request to a selected one of the plural computers based at least in part on location of the selected computer relative to a client from which the request is initiated.

2. The method of claim 1 wherein the routing is performed at least in part based on a content identification type provided with the request.

3. The method of claim 1 wherein the routing is performed in part on a requesting device based on content identification type selected from among plural content identification systems.

4. The method of claim 1 wherein load balancing is performed among the plural computers based on information about the content identification type and location of a request relative to one of the computers.

5. In a content identification system, a system of routing comprising:

a distributed network of computers at different locations, each comprising a portion of a content identification registry;

a router for receiving a request to associate a content object with information about the content object, the request being based on information discerned from perceptual information of the content object, and for routing the request to a selected one of the plural computers based at least in part on location of the selected computer relative to a client from which the request is initiated.

* * * * *